(12) United States Patent
Bryant, II (10) Patent No.: US 9,111,277 B2
(45) Date of Patent: Aug. 18, 2015

(54) METHODS AND SYSTEMS FOR PROCESSING ELECTRONIC TRANSACTIONS AND MANAGING VEHICLE COSTS

(71) Applicant: MasterCard International Incorporated, Purchase, NY (US)

(72) Inventor: Dexter Edward Bryant, II, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 13/721,951

(22) Filed: Dec. 20, 2012

(65) Prior Publication Data

US 2014/0180854 A1  Jun. 26, 2014

(51) Int. Cl.
*G06G 1/12*   (2006.01)
*G06Q 20/00*   (2012.01)
*G06Q 40/00*   (2012.01)
*G08G 1/00*   (2006.01)
*G06Q 20/40*   (2012.01)

(52) U.S. Cl.
CPC ............................. *G06Q 20/401* (2013.01)

(58) Field of Classification Search
USPC ........................................................... 705/21
See application file for complete search history.

(56) References Cited

U.S. PATENT DOCUMENTS

| | | | |
|---|---|---|---|
| 6,026,375 A | | 2/2000 | Hall et al. |
| 6,222,463 B1* | | 4/2001 | Rai ............................... 340/928 |
| 6,505,106 B1* | | 1/2003 | Lawrence et al. ............ 701/29.3 |
| 6,507,727 B1 | | 1/2003 | Henrick |
| 6,751,475 B1* | | 6/2004 | Holmes et al. ................ 455/557 |
| 6,894,601 B1* | | 5/2005 | Grunden et al. ........... 340/10.41 |
| 7,155,322 B2* | | 12/2006 | Nakahara et al. ............ 701/33.4 |
| 7,249,039 B2* | | 7/2007 | Yoshioka et al. .................. 705/4 |
| 7,970,644 B2* | | 6/2011 | Hedley et al. ................... 705/13 |
| 8,025,226 B1* | | 9/2011 | Hopkins et al. ............... 235/384 |
| 8,370,254 B1* | | 2/2013 | Hopkins et al. ................ 705/39 |
| 8,407,144 B2* | | 3/2013 | Roberts et al. ................. 705/40 |
| 8,417,598 B2* | | 4/2013 | Pinkusevich et al. ........... 705/34 |
| 2002/0016655 A1* | | 2/2002 | Joao ............................... 701/35 |
| 2002/0032506 A1* | | 3/2002 | Tokitsu et al. .................. 701/29 |
| 2002/0097178 A1* | | 7/2002 | Thomas et al. ................. 342/47 |
| 2002/0101363 A1* | | 8/2002 | Ogura et al. .............. 340/932.2 |
| 2002/0190118 A1* | | 12/2002 | Davenport et al. ........... 235/375 |
| 2003/0050095 A1* | | 3/2003 | Chen et al. .................... 455/558 |
| 2003/0069673 A1* | | 4/2003 | Hong et al. ..................... 701/29 |
| 2003/0069784 A1* | | 4/2003 | Banerjee et al. ............... 705/13 |

(Continued)

*Primary Examiner* — Ashford S Hayles
(74) *Attorney, Agent, or Firm* — Armstrong Teasdale LLP (57) ABSTRACT

A computer-implemented method for performing an electronic transaction using a payment computer coupled to a database is provided. The transaction includes an item purchased in association with a vehicle and initiated by a cardholder with a merchant. The method includes receiving, at the payment computer, an authorization request message from the merchant, the authorization request message including first transaction data, wherein the first transaction data includes a vehicle identifier for identifying the vehicle; transmitting an authorization response message from the payment computer to the merchant; storing, within the database, the first transaction data including the vehicle identifier; storing, within the database, other transaction data associated with other purchased items for the vehicle, wherein the first transaction data and the other transaction data define a total transaction data associated with the vehicle; and tracking, by the vehicle identifier, the total transaction data for access by the cardholder.

28 Claims, 7 Drawing Sheets

(56) References Cited

U.S. PATENT DOCUMENTS

| | | | |
|---|---|---|---|
| 2003/0212996 A1 | 11/2003 | Wolzien | |
| 2004/0036584 A1* | 2/2004 | Briick | 340/426.13 |
| 2005/0033694 A1* | 2/2005 | Perrin | 705/44 |
| 2005/0102075 A1* | 5/2005 | Dar et al. | 701/29 |
| 2005/0125669 A1* | 6/2005 | Stewart et al. | 713/171 |
| 2005/0203673 A1* | 9/2005 | El-Hajj et al. | 701/1 |
| 2007/0061069 A1* | 3/2007 | Christensen | 701/209 |
| 2007/0225912 A1* | 9/2007 | Grush | 701/213 |
| 2008/0040210 A1* | 2/2008 | Hedley | 705/13 |
| 2008/0208656 A1* | 8/2008 | Matsubara | 705/7 |
| 2008/0208680 A1* | 8/2008 | Cho | 705/13 |
| 2009/0024525 A1* | 1/2009 | Blumer et al. | 705/41 |
| 2009/0157566 A1* | 6/2009 | Grush | 705/400 |
| 2009/0289113 A1* | 11/2009 | Vilnai et al. | 235/381 |
| 2010/0030461 A1* | 2/2010 | Maekawa et al. | 701/201 |
| 2010/0057624 A1* | 3/2010 | Hurt et al. | 705/76 |
| 2010/0073124 A1* | 3/2010 | Mahalingaiah et al. | 340/5.1 |
| 2010/0076878 A1* | 3/2010 | Burr et al. | 705/34 |
| 2010/0088127 A1* | 4/2010 | Betancourt et al. | 705/5 |
| 2010/0102997 A1 | 4/2010 | Pikolon | |
| 2010/0114616 A1* | 5/2010 | Touati | 705/5 |
| 2010/0115093 A1* | 5/2010 | Rice | 709/224 |
| 2010/0115505 A1* | 5/2010 | Touati et al. | 717/171 |
| 2010/0161481 A1* | 6/2010 | Littrell | 705/40 |
| 2010/0228608 A1* | 9/2010 | Hedley et al. | 705/13 |
| 2010/0280956 A1* | 11/2010 | Chutorash et al. | 705/64 |
| 2010/0287038 A1* | 11/2010 | Copejans | 705/13 |
| 2010/0325049 A1* | 12/2010 | Tanaka | 705/44 |
| 2010/0332363 A1* | 12/2010 | Duddle et al. | 705/34 |
| 2011/0035049 A1* | 2/2011 | Barrett | 700/232 |
| 2011/0133952 A1* | 6/2011 | McNamara et al. | 340/905 |
| 2011/0215897 A1* | 9/2011 | Simpson et al. | 340/5.1 |
| 2011/0231310 A1* | 9/2011 | Roberts et al. | 705/40 |
| 2011/0288721 A1* | 11/2011 | Christensen et al. | 701/30 |
| 2012/0072311 A1 | 3/2012 | Khan | |
| 2012/0109797 A1* | 5/2012 | Shelton et al. | 705/34 |
| 2012/0116959 A1 | 5/2012 | Pitroda et al. | |
| 2012/0191524 A1* | 7/2012 | Ambrosio et al. | 705/14.23 |
| 2012/0209579 A1* | 8/2012 | Fansler et al. | 703/8 |
| 2012/0231726 A1 | 9/2012 | Poltorak | |
| 2012/0323771 A1* | 12/2012 | Michael | 705/39 |
| 2013/0065576 A1* | 3/2013 | Basir | 455/419 |
| 2013/0085928 A1* | 4/2013 | McKinney | 705/39 |
| 2013/0103585 A1* | 4/2013 | Carapelli | 705/44 |
| 2013/0132286 A1* | 5/2013 | Schaefer et al. | 705/305 |
| 2013/0138460 A1* | 5/2013 | Schumann et al. | 705/4 |
| 2013/0300582 A1* | 11/2013 | McNamara et al. | 340/905 |
| 2014/0019170 A1* | 1/2014 | Coleman et al. | 705/4 |
| 2014/0058805 A1* | 2/2014 | Paesler et al. | 705/13 |
| 2014/0136329 A1* | 5/2014 | Chang | 705/14.62 |

* cited by examiner

METHODS AND SYSTEMS FOR PROCESSING ELECTRONIC TRANSACTIONS AND MANAGING VEHICLE COSTS

BACKGROUND OF THE DISCLOSURE

This invention relates generally to systems and methods for performing an electronic transaction and, more particularly, to network-based systems and methods for processing and tracking electronic transactions relating to a vehicle wherein the transaction is initiated by a cardholder having a transaction account.

Electronic transaction cards are widely used in the United States and elsewhere as a means to attract financial accounts to financial institutions and, in the case of credit cards, as a medium to create small loans and generate interest income for financial institutions.

Many electronic transactions are associated with vehicle costs. Some vehicle models include electronic capabilities such as accessing the Internet and accessing satellite navigation systems. Moreover, some vehicle models include electronic hardware such as DVD players and monitors that display and/or interact with these electronic capabilities. These electronic capabilities require periodic payments, such as monthly payments, to be paid by the user. Multiple payments for vehicle applications, in addition to other payments such as mortgage and cell phone payments, can lead to inefficient cost accounting, tracking of expenses, missed bill payments and/or increased time consumption for the user to organize vehicle costs.

Regular vehicle tasks such as pumping fuel and changing the oil require costs that are difficult to record and track for consumption monitoring purposes. Moreover, tasks, such as fuel pumping, require the user to exit the car, engage a transaction card with the fuel pump, input information such as a zip code and choose a fuel. The user then engages the fuel hose with the vehicle and chooses an amount of fuel and pumps the fuel. The user then waits to pay for the transaction or walks into the merchant's store to pay for the transaction. Sometimes, these time-consuming activities are conducted in inclement weather such as rain, snow or heat.

In addition to providing certain information to satisfy the security measures implemented by merchants, issuing banks or other parties involved in the electronic purchasing process, such as vehicle cardholders must also manually provide other information to the merchant to complete the transaction. This information can include, for example, billing and/or shipping addresses, or the name, birth date, phone number, email address or other information concerning the cardholder. This information is typically received when the cardholder manually enters the information into a computer system/input device. The process of manually entering this information can be time-consuming and tedious for the cardholder. Furthermore, the user-entered information may contain errors (e.g., typographical errors) since it is manually provided by the user.

Accordingly, a system and method is needed that utilizes known protocols for communicating information between vehicle computer devices, merchant computer devices, payment computer devices, and other third party devices in order to enhance and further automate processing and tracking vehicle transactions and payments.

BRIEF DESCRIPTION OF THE DISCLOSURE

In one embodiment, a computer-implemented method for performing an electronic transaction using a payment computer coupled to a database is provided. The transaction includes an item purchased in association with a vehicle and initiated by a cardholder with a merchant. The method includes receiving, at the payment computer, an authorization request message from the merchant, the authorization request message including a first transaction data, wherein the first transaction data includes a vehicle identifier for identifying the vehicle, an account data associated with the cardholder, and a purchase data associated with a first purchased item; transmitting an authorization response message from the payment computer to the merchant, the authorization response message including an approval of the electronic transaction by an issuer bank; storing, within the database, the first transaction data including the vehicle identifier; storing, within the database, other transaction data associated with other purchased items for the vehicle, wherein the first transaction data and the other transaction data define a total transaction data associated with the vehicle; and tracking, by the vehicle identifier, the total transaction data for access by the cardholder.

In another aspect, a computer device coupled to a vehicle for performing an electronic transaction using a payment computer coupled to a database is provided. The transaction is initiated by the cardholder with a merchant. The vehicle computer device is programmed to: access an offer data from the merchant; transmit a purchase data associated with a purchase item of the offer data from the vehicle computer to the merchant; transmit a transaction data includes a vehicle identifier associated with the vehicle, an account data associated with the cardholder and the purchase data to the payment computer for storage thereon; and access, by the vehicle identifier, the stored transaction data from the payment computer.

In a further aspect, one or more non-transitory computer-readable storage media having computer-executable instructions embodied thereon for processing an electronic transaction using a payment computer coupled to a database is provided. The electronic transaction includes an item purchased in association with a vehicle and initiated by a cardholder with a merchant, wherein the payment computer includes a memory device and a processor. When executed by the processor, the computer-executable instructions cause the processor to: receive an authorization request message from the merchant, the authorization request message including a first transaction data, wherein the first transaction data includes a vehicle identifier for identifying the vehicle, an account data associated with the cardholder, and a purchase data associated with a first purchased item; transmit an authorization response message including an approval of the electronic transaction by an issuer bank; store, within the database, the first transaction data including the vehicle identifier; store, within the database, other transaction data associated with other purchased items for the vehicle, wherein the first transaction data and the other transaction data define a total transaction data associated with the vehicle; and track, by the vehicle identifier, the total transaction data for access by the cardholder.

Still further, in another aspect, a system for performing an electronic transaction initiated including an item purchased in association with a vehicle and initiated by a cardholder with a merchant is provided. The system includes an payment computer configured to: receive an authorization request message from the merchant, the authorization request message including a first transaction data, wherein the first transaction data includes a vehicle identifier for identifying the vehicle, an account data associated with the cardholder, and purchase data associated with a first purchased item; transmit an authorization response message including an approval of the electronic transaction by an issuer bank; store, within the database, the first transaction data including the vehicle identifier; store, within the database, other transaction data associated with other purchased items for the vehicle, wherein the first transaction data and the other transaction data define a total transaction data associated with the vehicle; and track, by the vehicle identifier, the total transaction data for access by the cardholder. The system further includes a vehicle computer configured to transmit a call report to the payment computer; and receive, from the payment computer, a report message associated with the total transaction data.

BRIEF DESCRIPTION OF THE DRAWINGS

FIGS. 1-7 show exemplary embodiments of the methods and systems described herein.

DETAILED DESCRIPTION OF THE DISCLOSURE

The methods and systems described herein relate to an electronic transaction card payment system, such as a credit card payment system using the MasterCard® interchange network (MasterCard is a registered trademark of MasterCard International Incorporated located in Purchase, N.Y.). The MasterCard® interchange network is a proprietary communications standard promulgated by MasterCard International Incorporated® for the exchange of electronic transaction data between financial institutions that have registered with MasterCard International Incorporated®.

The following detailed description illustrates embodiments of the invention by way of example and not by way of limitation. It is contemplated that the invention has general application to processing electronic transaction data by a third party in vehicular applications. As used herein, an element or step recited in the singular and proceeded with the word "a" or "an" should be understood as not excluding plural elements or steps, unless such exclusion is explicitly recited. Furthermore, references to "one embodiment" and/or "another embodiment" of the present invention are not intended to be interpreted as excluding the existence of additional embodiments that also incorporate the recited features.

As used herein, the term "transaction card" or "payment card" refers to any suitable transaction card, such as a credit card, a debit card, a membership card, a promotional card, a frequent flyer card, an identification card, a prepaid card, a gift card, and/or any other device that may hold payment account information, such as mobile phones, personal digital assistants (PDAs), and key fobs.

The embodiments described herein are directed to systems and methods for performing a transaction using a vehicle computer device and tracking costs associated with a particular vehicle. The transaction is performed by a user of a transaction card. These users are referred to as cardholders. A cardholder is issued a transaction card by an issuer or an issuing bank. The cardholder is able to use the transaction card at participating merchants to initiate transactions. The merchant processes these transactions using a point-of-sale (POS) device that captures certain transaction information and communicates this information over an interchange network to a merchant bank and ultimately to the issuer. Information is then exchanged between these parties over the interchange network until the transaction is completed.

During operation, a cardholder receives offer data from the merchant (e.g., directly or over the payment network) and initiates a transaction with the merchant (e.g., directly or over the payment network) via a user computer device associated with the cardholder. In an exemplary embodiment, the user computer device is a component of the user's vehicle and therefore may be referred to as a vehicle computer device. The vehicle computer device transmits purchase data, account data, and vehicle identifier to the merchant computer device. More particularly, the cardholder transmits a purchase selection instruction from the vehicle computer device using an input device. This purchase selection instruction includes purchase data, which identifies an item (i.e., a product and/or service) which the cardholder desires to purchase from the merchant. After the user has selected items to purchase, the vehicle computer device communicates the account data and the vehicle identifier to the merchant computer device. The merchant computer then generates an authorization request message and transmits the authorization request message to the payment computer system.

Upon receipt of the payment authorization request message, the payment computer system may prompt the cardholder to enter access credential information, such as, but not limited to, a username, a password, a security token, and/or biometric data. In one embodiment, the payment computer system receives a request that originates at the vehicle computer device and is forwarded to the payment computer system by the merchant computer. In another embodiment, the vehicle computer device is configured to access a web address (e.g., a uniform resource locator (URL)) associated with the payment computer system, and the payment computer system receives a transaction request directly from the vehicle computer device. In either embodiment, the payment computer system prompts the cardholder for credential access information through a user interface in communication with the vehicle computer device.

The cardholder enters the access credential information, and the payment computer system receives the access credential information from the vehicle computer device. The payment computer system verifies the access credential information. More particularly, the payment computer system compares the authorization response of the credential information and data associated with the cardholder with a cardholder database of the payment computer system. If the verification succeeds (e.g., the access credential information matches access credential information stored by and/or calculated by the payment computer system), the payment computer system prompts the cardholder for payment information for the current transaction. Payment information includes, without limitation, transaction card information, contact information (e.g., an email address and/or a telephone number), a promotion code, billing information, and/or shipping information. Transaction card information may include, for example, a card identifier (e.g., an account number, a partial account number, and/or a card name), a security code, and/or an expiry date. Shipping information may include, for example, a delivery address and/or delivery instructions.

In some embodiments, the payment computer system prompts the cardholder to select from one or more options indicating previously stored payment information. For example, the payment computer system may prompt the cardholder to select a transaction card from one or more transaction cards previously associated with the cardholder. The payment computer system may similarly prompt the cardholder to select any other payment information.

The payment computer system receives the payment information from the vehicle computer device either directly or through the merchant computer device. The payment computer system forwards the authorization request message to the issuing bank so that the issuing bank can determine whether to approve or decline the transaction. The issuing bank generates an authorization response message and transmits the authorization response message to the payment computer system. In one embodiment, the payment computer system receives a selected transaction card identifier from the vehicle computer device and retrieves an account number (e.g., a primary account number (PAN)), a security code (e.g., a CVC2 code and/or a personal identification number (PIN)), and/or an expiry date based on the selected transaction card identifier. The merchant computer device, or vehicle computer device, receives the authorization response message from the payment computer system so that the transaction can be completed.

A technical effect of the systems and methods described herein is achieved by performing at least one of the following steps: (a) accessing a merchant computer device from a vehicle computer device for receiving offer data from the merchant computer device; (b) transmitting purchase data from the vehicle computer device to the merchant computer device wherein purchase data identify the item (i.e., the product and/or service) being purchased by the cardholder; (c) transmitting vehicle identifier, account data and purchase data from the vehicle computer device to the merchant computer device wherein the account data and vehicle identifier are either pre-stored within the vehicle computer device or inputted by the cardholder using the vehicle computer device, and wherein the vehicle identifier identify the selected vehicle; (d) generating an authorization request message at the merchant computer device wherein the authorization request message includes at least the vehicle identifier, account data, and the purchase data; (e) transmitting the authorization request message from the merchant computer device to the payment computer device for processing and further transmission to an issuing bank; (f) receiving at the payment computer device an authorization response message from the issuing bank either approving or denying the transaction; (g) when approved, storing transaction data at the payment computer device, wherein the transaction data include at least the account data, the purchase data, and the vehicle identifier; (h) transmitting the approved authorization response message to the merchant computer device so that the transaction can be completed with the cardholder; (i) transmitting a report call from the vehicle computer device to the payment computer device, wherein the report call is a request for the payment computer device to generate a report message from the stored transaction data for the selected vehicle; and (j) receiving the report message and displaying it on the vehicle computer device. Additionally, the vehicle computer device is configured to access a third party payment module (e.g., a third party website) to perform other electronic transactions, wherein these transactions are performed by the vehicle computer device communicating directly through the third party payment module and not through the merchant point-of-sale device.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is executed in a Windows® environment (Windows is a registered trademark of Microsoft Corporation, Redmond, Wash.). In yet another embodiment, the system is executed in a mainframe environment and a UNIX® server environment (UNIX is a registered trademark of AT&T, New York, N.Y.). The application is flexible and designed to operate in different environments without compromising any major functionality.

The systems and processes described herein are not limited to the specific embodiments described herein. In addition, components of each system and each process can be practiced independent of and separate from other components and processes described herein. Each component and process also can be used in combination with other assembly packages and processes.

The following detailed description illustrates embodiments of the invention by way of example and not by way of limitation. It is contemplated that the invention has general application to processing electronic transaction data by a third party in industrial, commercial, and residential applications.

Figure 1:
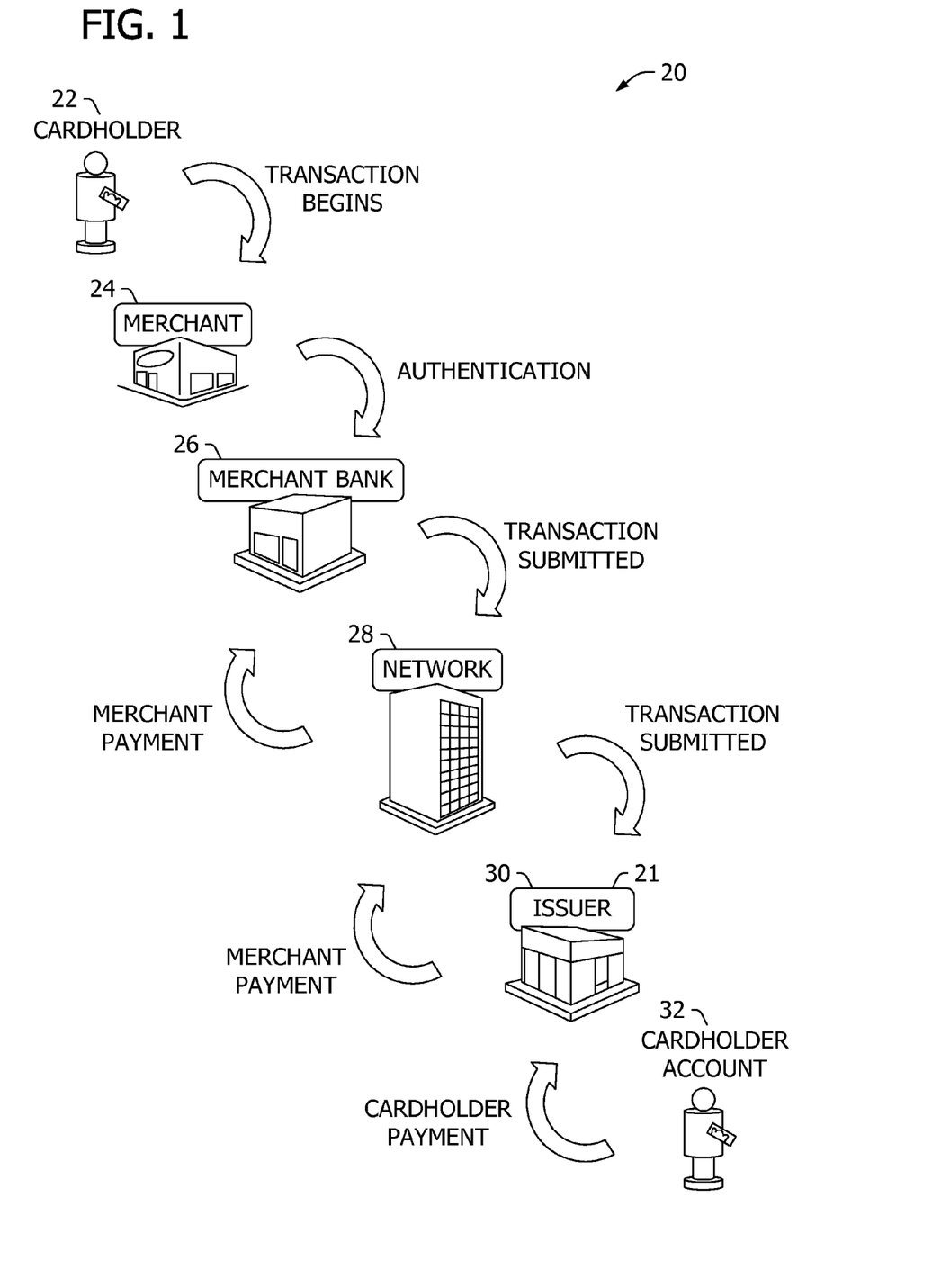
FIG. 1 is a simplified block diagram of an exemplary service system including a plurality of computer devices in accordance with one embodiment of the present invention.

FIG. 1 is a schematic diagram illustrating a multi-party payment card system 20 for enabling ordinary payment-by-card transactions in which merchants and card issuers do not necessarily have a one-to-one relationship in accordance with one exemplary embodiment of the invention. In the exemplary embodiment, the payment card system 20 relates to a system, such as a credit card payment system using the MasterCard® payment system. The MasterCard® payment system is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In a typical payment card system 20, a financial institution such as issuer 21 issues a payment card, such as a credit card account or a debit card account, to a cardholder 22, who uses the payment card to tender payment for a purchase from a merchant 24. To accept payment with the payment card, merchant 24 must normally establish an account with a financial institution that is part of the financial payment system. This financial institution is usually called the "merchant bank" or the "acquiring bank" or "acquirer bank." When a cardholder 22 tenders payment for a purchase with a payment card, merchant 24 requests authorization from merchant bank 26 for the amount of the purchase. The request may be performed over the telephone, but is usually performed through the use of a point-of-sale terminal, which reads the cardholder's account information from the magnetic stripe on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor" or an "acquiring processor."

Using a network interface processor 28, the computers of the merchant bank or the merchant processor will communicate with the computers of issuer 30 to determine whether the cardholder's account is in good standing and whether the purchase is covered by the cardholder's available credit line or account balance. Based on these determinations, the request for authorization will be declined or accepted. If the request is accepted, an authorization code is issued to merchant 24.

When a request for authorization is accepted, the available credit line or available balance of cardholder's account 32 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 24 captures the transaction by, for example, appropriate data entry procedures on the point-of-sale terminal. If a cardholder cancels a transaction before it is captured, a "void" is generated. If a cardholder returns goods after the transaction has been captured, a "credit" is generated.

For debit card transactions, when a request for a PIN authorization is approved by the issuer, the cardholder's account 32 is decreased. Normally, a charge is posted immediately to cardholder's account 32. The bankcard association then transmits the approval to the acquiring processor for distribution of goods/services, or information or cash in the case of an ATM.

After a transaction is captured, the transaction is settled between merchant 24, merchant bank 26, and issuer 30. Settlement refers to the transfer of financial data or funds between the merchant's account, merchant bank 26, and issuer 30 related to the transaction. Usually, transactions are captured and accumulated into a "batch," which is settled as a group.

Figure 2:
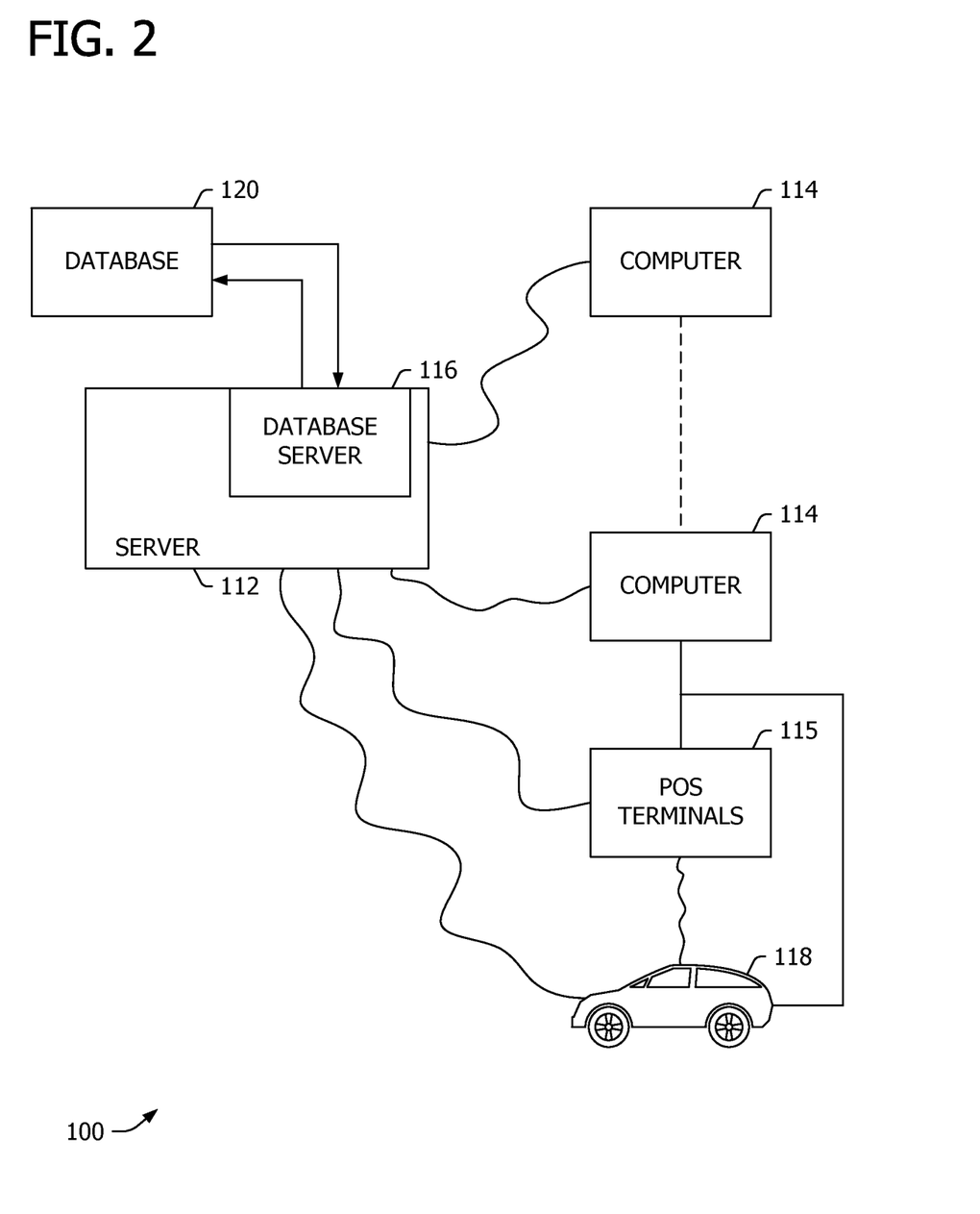
FIG. 2 is a simplified block diagram of an exemplary embodiment of a server architecture including a vehicle computer device for providing a vehicle cost management service in accordance with one embodiment of the present invention.

FIG. 2 is a simplified block diagram of an exemplary payment card account system 100 including a vehicle cost management service in accordance with one embodiment of the present invention. System 100 can be utilized by cardholders as part of a process of initiating an authorization request and performing a transaction as described below. In addition, system 100 is a payment card account system having a vehicle computer device 118, which a cardholder may use to access a merchant's website, conduct electronic transactions, and/or record payments for electronic transactions relative to vehicle costs. Vehicle computer device 118 also enables a cardholder to manage and track costs relating to the operation of the vehicle.

More specifically, in the example embodiment, system 100 includes a server system 112, which is a type of computer system, and a plurality of client sub-systems (also referred to as client systems 114) connected to server system 112. In one embodiment, client systems 114 are computers including a web browser and a memory device, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed ISDN lines. Client systems 114 could be any device capable of interconnecting to the Internet including a web-based phone, personal digital assistant (PDA), or other web-based connectable equipment.

System 100 also includes point-of-sale (POS) terminals 115, which are connected to client systems 114 and may be connected to server system 112. POS terminals 115 are interconnected to the Internet through many interfaces including a network, such as a local area network (LAN) or a wide area network (WAN), dial-in-connections, cable modems, wireless modems, and special high-speed ISDN lines. POS terminals 115 could be any device capable of interconnecting to the Internet and including an input device capable of reading information from a cardholder's financial transaction card.

A database server 116 is connected to a database 120, which contains information on a variety of matters, as described below in greater detail. In one embodiment, centralized database 120 is stored on server system 112 and can be accessed by cardholders at one of client systems 114 by logging onto server system 112 through one of client systems 114. In an alternative embodiment, database 120 is stored remotely from server system 112 and may be non-centralized. Database 120 may store transaction data generated as part of sales activities conducted over the bankcard network including data relating to merchants, account holders or customers, and purchases. Database 120 may also store account data including at least one of a cardholder name, a cardholder address, an account number, and other account identifiers. Database 120 may also store merchant data including a merchant identifier that identifies each merchant registered to use the payment account card network, and instructions for settling transactions including merchant bank account information. Database 120 may also store PAN numbers or bank account numbers for various parties including merchants and customers, along with payment verification identifiers and other data necessary to implement the system and processes described herein.

System 100 also includes at least one vehicle computer device 118, which is configured to communicate with at least one of POS terminal 115, client systems 114, and server system 112. In one embodiment, vehicle computer device 118 is associated with or controlled by a cardholder making a purchase using a payment card account and payment card account system 100. Vehicle computer device 118 is a component of a vehicle and may therefore be referred to as a vehicle computer device. Vehicle computer device 118 is interconnected to the Internet through many interfaces including a network, such as a LAN or a WAN, dial-in-connections, cable modems, wireless modems, and special high-speed ISDN lines. Vehicle computer device 118 could be any device capable of interconnecting to the Internet including a web-based phone, PDA, or other web-based connectable equipment. Vehicle computer device 118 is configured to communicate with POS terminal 115 using various outputs including, for example, Bluetooth communication, radio frequency communication, near field communication, network-based communication, and the like.

In the example embodiment, one of client systems 114 may be associated with an acquirer, a cardholder, or a customer; while another one of client systems 114 may be associated with an issuer; POS terminal 115 may be associated with a merchant; vehicle computer device 118 may be associated with a cardholder or a customer; and server system 112 may be associated with the payment network or the interchange network.

In the example embodiment, server system 112 may be associated with a payment network, and may be referred to as a payment computer device. Server system 112 may be used for processing transaction data and for registering cardholders into a plurality of programs offered by the payment network. In addition, at least one of client systems 114 may include a computer system associated with an issuer of a transaction card. Accordingly, server system 112 and client systems 114 may be utilized to process transaction data relating to purchases made by a cardholder utilizing a transaction card that is processed by the payment network and issued by the associated issuer. Another client system 114 may be associated with a user or a cardholder seeking to register access information or process a transaction with at least one of the payment network, the issuer, the POS, or the merchant computer.

The embodiments illustrated and described herein as well as embodiments not specifically described herein but within the scope of aspects of the invention constitute exemplary means for performing a financial transaction, and more particularly, constitute exemplary means for performing a financial transaction using a vehicle computer device and tracking costs associated with a particular vehicle. For example, server system 112, POS terminal 115, client system 114, vehicle computer device 118, or any other similar computer device, programmed with computer-executable instructions to execute processes and techniques with a processor as described herein, constitutes exemplary means for enabling a cardholder to manage and track costs relating to the operation of the particular vehicle using a vehicle computer device.

Figure 3:
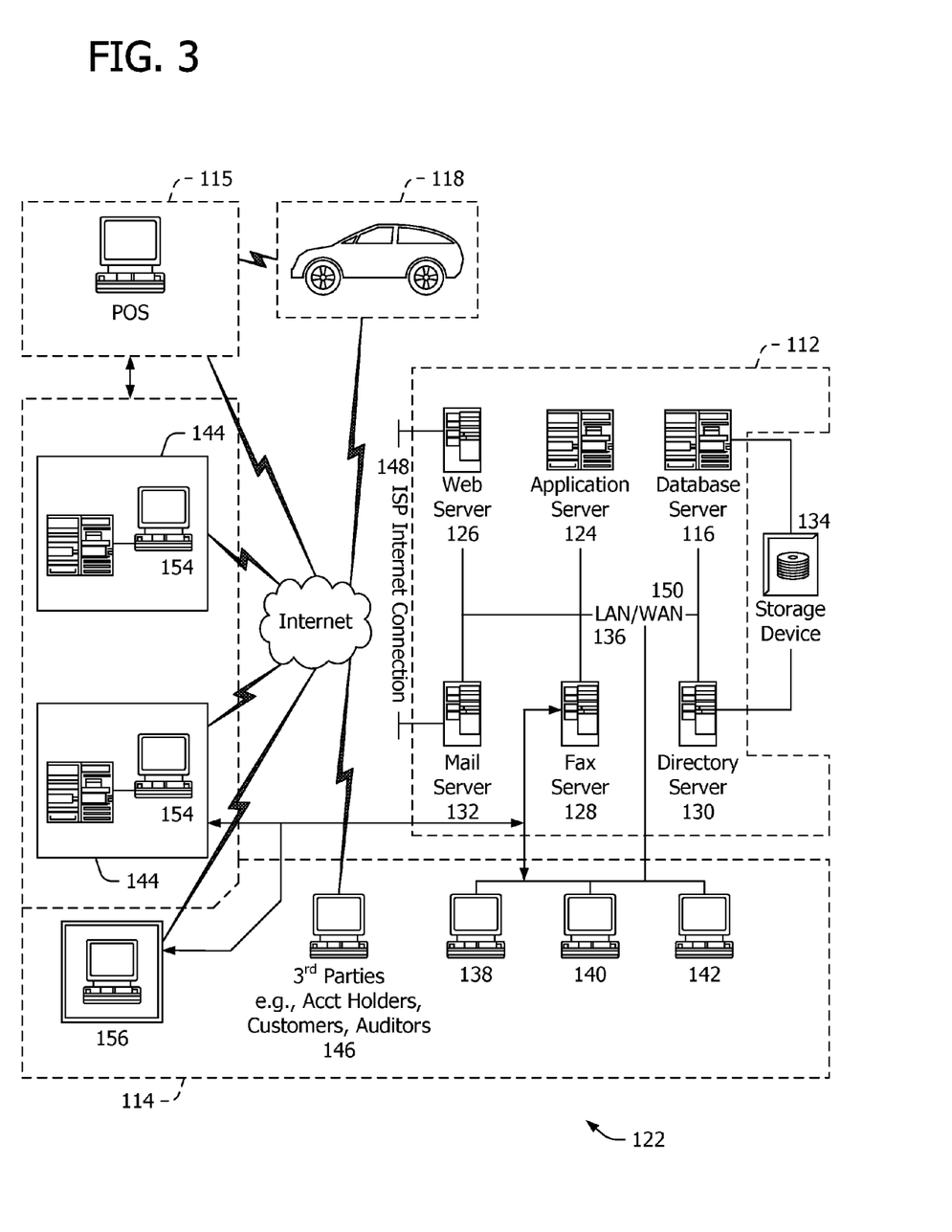
FIG. 3 is an expanded block diagram of an exemplary embodiment of a server architecture of the payment card account system shown in FIG. 2.

FIG. 3 is an expanded block diagram of an exemplary embodiment of a server architecture of a payment card account system 122 for providing a vehicle cost management service as shown in FIG. 2. Components in system 122, identical to components of system 100 (shown in FIG. 2), are identified in FIG. 3 using the same reference numerals as used in FIG. 2. System 122 includes server system 112, client systems 114, POS terminals 115, and vehicle computer device 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a LAN 136. In addition, a system administrator's workstation 138, a cardholder's workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties 146, e.g., account holders, customers, auditors, etc., using an ISP Internet connection 148. The communication in one embodiment is illustrated as being performed using the Internet, however, any other WAN type communication can be utilized in other embodiments, i.e., the systems and processes are not limited to being practiced using the Internet. In addition, and rather than WAN 150, LAN 136 could be used in place of WAN 150.

In one embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients and servers, including random access memory (RAM), read-only memory (ROM), erasable programmable ROM (EPROM), electrically erasable programmable ROM (EEPROM), and/or non-volatile RAM (NVRAM) memory. The above memory types are exemplary only, and are thus not limiting as to the types of memory usable for storage of a computer program.

Figure 4:
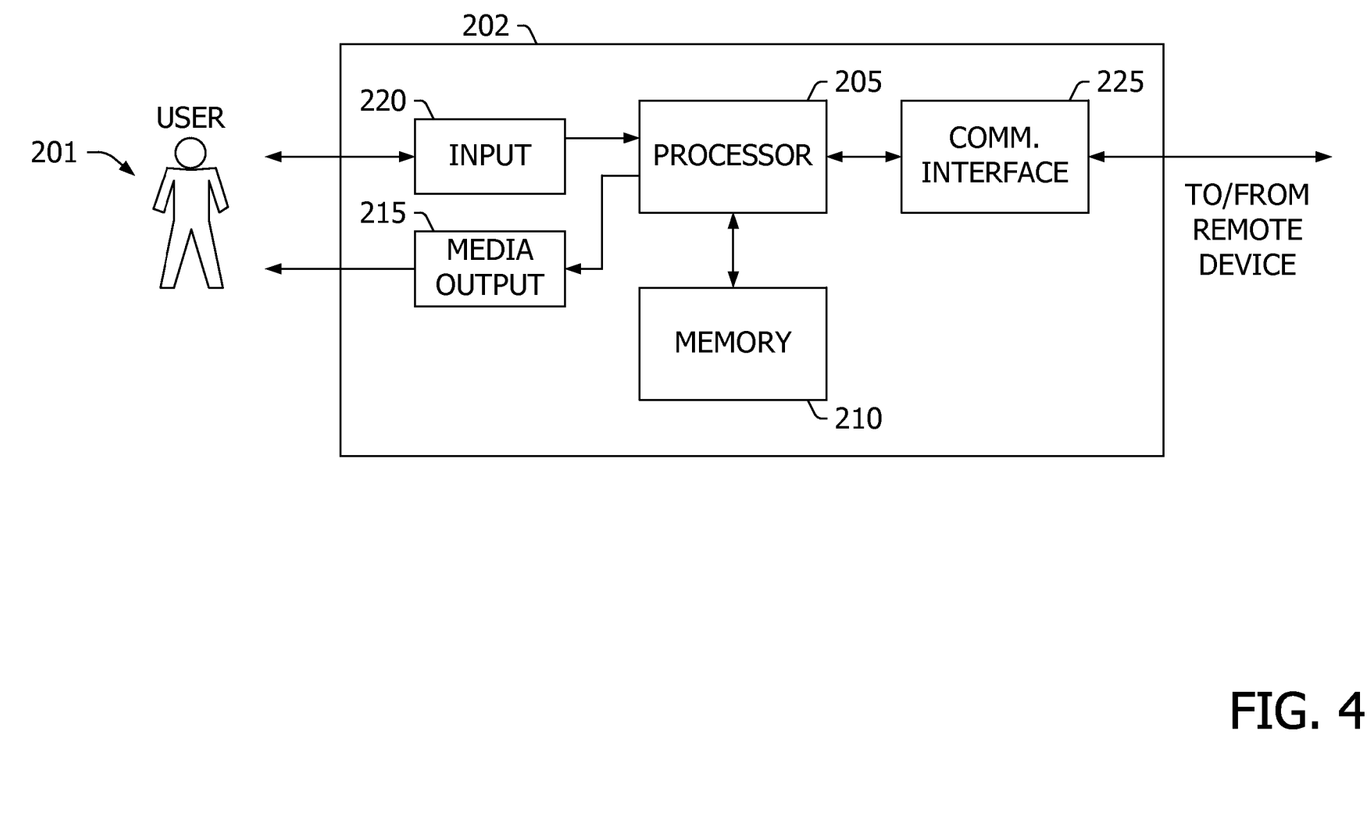
FIG. 4 illustrates an exemplary configuration of a user computer device operated by a user such as the computer devices shown in FIGS. 2 and 3.

FIG. 4 illustrates an exemplary configuration of a user computer device 202 operated by a user 201. User computer device 202 may include, but is not limited to, client systems 114, 138, 140, and 142, POS terminal 115, vehicle computer device 118, workstation 154, and manager workstation 156 (shown in FIG. 3).

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or other data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, user computer device 202 includes an input device 220 for receiving input from user 201. User may use input device 220 to transmit purchase selection instructions to select and/or enter, without limitation, one or more goods and/or services to purchase, a purchase request, access credential information and/or payment information. Input device 220 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable cardholders, such as user 201, to display and interact with media and other information typically embedded on a web page or a website from server system 112. A client application allows user 201 to interact with a server application from server system 112.

Figure 5:
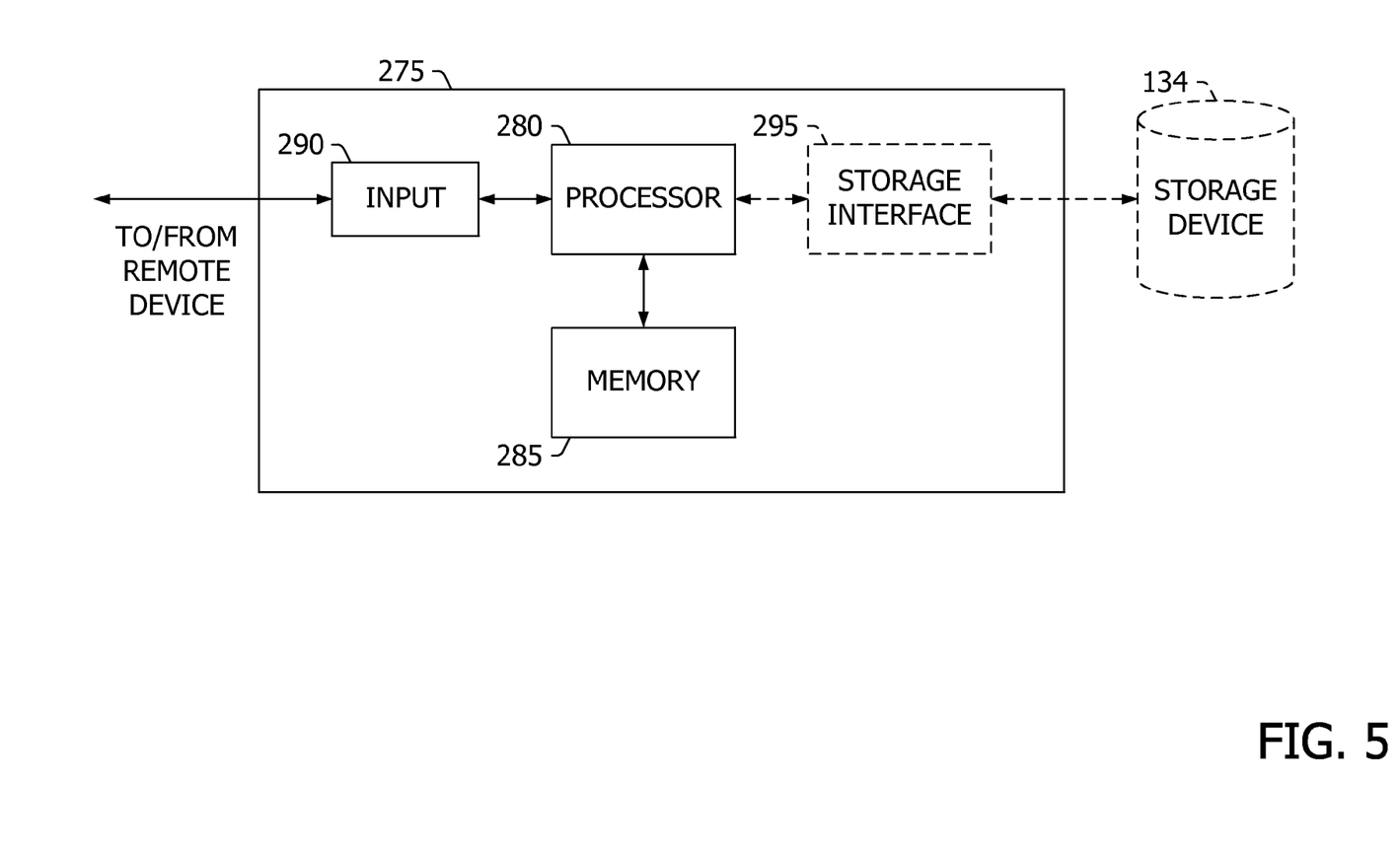
FIG. 5 illustrates an exemplary configuration of a server computer device such as the server system shown in FIGS. 2 and 3.

FIG. 5 illustrates an exemplary configuration of a server computer device 275 such as server system 112 (shown in FIGS. 2 and 3). Server computer device 275 may include, but is not limited to, database server 116, transaction server 124, web server 126, fax server 128, directory server 130, and mail server 132.

Server computer device 275 includes a processor 280 for executing instructions. Instructions may be stored in a memory area 285, for example. Processor 280 may include one or more processing units (e.g., in a multi-core configuration).

Processor 280 is operatively coupled to a communication interface 290 such that server computer device 275 is capable of communicating with a remote device such as user computer device 202 (shown in FIG. 4) or another server computer device 275. For example, communication interface 290 may receive requests from client systems 114 or vehicle computer device 118 via the Internet, as illustrated in FIGS. 2 and 3.

Processor 280 may also be operatively coupled to a storage device 134. Storage device 134 is any computer-operated hardware suitable for storing and/or retrieving data. In some embodiments, storage device 134 is integrated in server computer device 275. For example, server computer device 275 may include one or more hard disk drives as storage device 134. In other embodiments, storage device 134 is external to server computer device 275 and may be accessed by a plurality of server computer devices 275. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 280 is operatively coupled to storage device 134 via a storage interface 295. Storage interface 295 is any component capable of providing processor 280 with access to storage device 134. Storage interface 295 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 280 with access to storage device 134.

Memory area 285 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
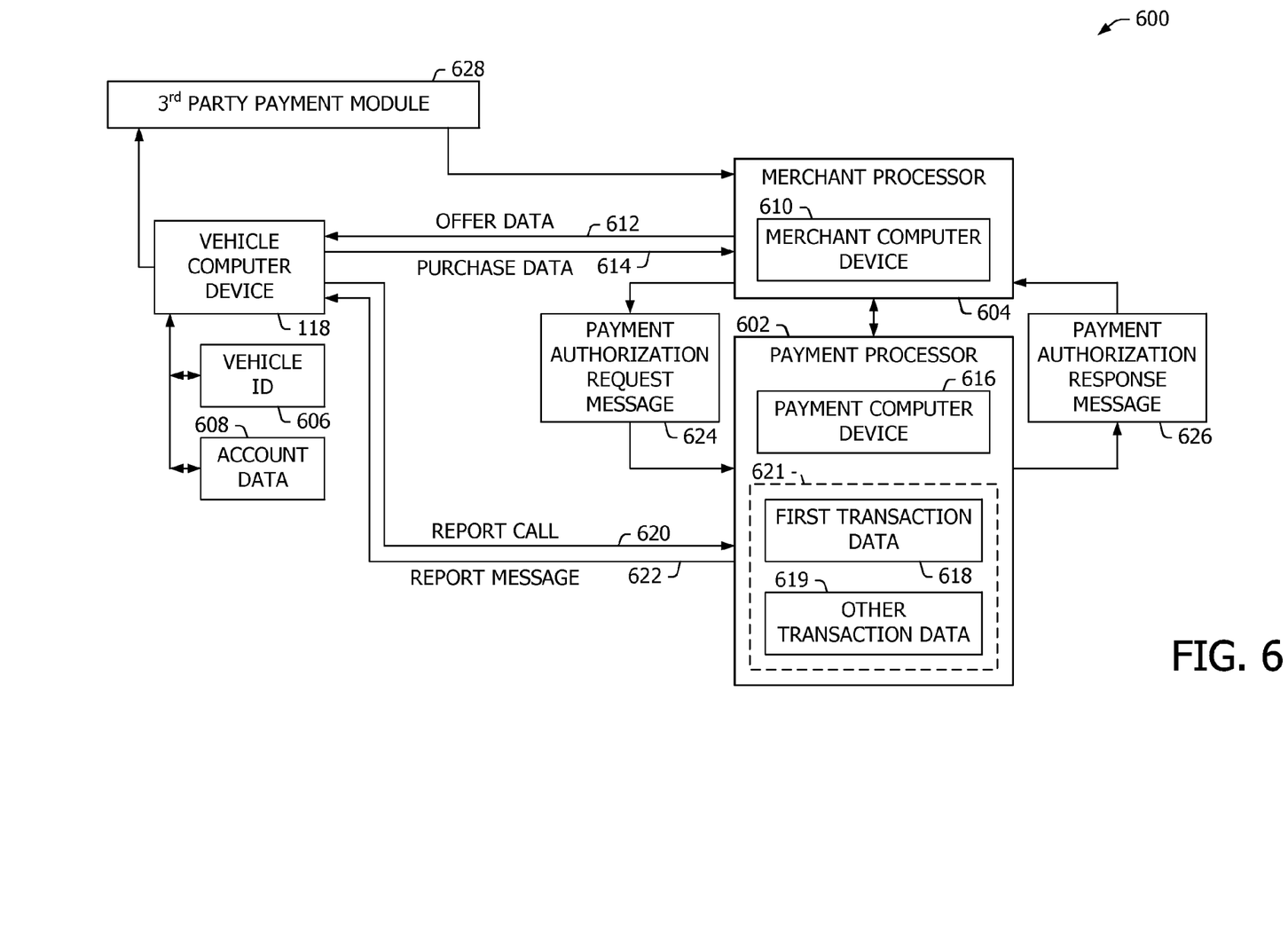
FIG. 6 is a block diagram of a system showing data flow between various computer devices in accordance with one embodiment of the present invention.

FIG. 6 is a block diagram of a payment card account system 600 showing data flow among a vehicle computer device 118, a payment processor 602, and a merchant processor 604. In the exemplary embodiment, system 600 may be a payment card account system such as system 122 (shown in FIGS. 1 and 2). In some embodiments, payment processor 602 may be an interchange network. Vehicle computer device 118 is configured to allow a cardholder to access payment processor 602 and merchant processor 604 and electronically transact with payment processor 602 and/or merchant processor 604 to purchase items/services associated with the merchant. In the exemplary embodiment, vehicle computer device 118 is coupled to a vehicle, such as, but not limited to, an automobile, a truck, a recreational vehicle, a motorcycle and a marine vessel. Moreover, vehicle computer device 118 includes a vehicle identifier 606 which includes a specific identifier, such as a number, to identify the vehicle to facilitate associating the particular vehicle with a particular purchased item. Different vehicles are assigned unique vehicle identifiers 606 to associate the transactions to the particular vehicle. Regardless of which cardholder and account data 608 are used to purchase the item, the purchased item is associated with the vehicle via vehicle identifier 606.

Merchant processor 604 includes a merchant computer device 610. In the exemplary embodiment, merchant computer device 610 may be a computer device such as user computer device 202 (shown in FIG. 4). Merchant computer device 610 is a service-provided device that is communicatively coupled to merchant processor 604. Merchant computer device 610 allows merchant processor 604 to communicate offer data 612 to vehicle computer device 118. Merchant processor 604 is configured to transmit first offer data 612 via at least one a cellular transmission, a Wi-Fi transmission, a Bluetooth transmission and a radio transmission. Merchant processor 604 can be configured to transmit first offer data 612 via any type of transmission. Offer data 612 includes information related to goods and/or services, associated with vehicle, provided by merchant processor 604. In one embodiment, merchant processor 604 is a gas station and offer data 612 is product information such as, for example, available fuel types, amount of fuel available for purchase, and available car wash services. Vehicle computer device 118 transmits a purchase data 614 to merchant computer device 610 after receiving offer data 612 from merchant computer device 610. Vehicle computer device 118 is configured to transmit purchase data 614 via at least one a cellular transmission, a Wi-Fi transmission, a Bluetooth transmission and a radio transmission. Vehicle computer device 118 can be configured to transmit first offer data 612 via any type of transmission. Purchase data 614 includes information responsive to offer data 612, i.e., purchase data 614 indicates a purchased item associated with the goods/services a cardholder would like to purchase from the merchant. In one embodiment, purchase data 614 includes a financial transaction, a product transaction and a service transaction. More particularly, financial transaction includes a vehicle loan payment and a vehicle insurance payment; product transaction includes a vehicle product related expense such as a tire; and service transaction includes a satellite service payment.

When merchant processor 604 receives purchase data 614, merchant computer device 610 generates a payment authorization request message 624. Payment authorization request message 624 is transmitted to payment computer device 616 for processing and further transmission to an issuing bank for approval. Payment computer device 616 may be used by a cardholder to process vehicle related transactions (e.g., vehicle insurance payments, vehicle loan payments, satellite service radio payments, and other vehicle related expenses). In one embodiment, payment computer device 616 includes an interchange computer associated with an interchange. A payment authorization response message 626 is received from the issuing bank and transmitted to merchant computer device 610 by payment computer device 616. Additionally, first transaction data 618 are stored at payment processor 602 after the transaction is processed by the issuing bank. First transaction data 618 include at least vehicle identifier 606 associated with the vehicle, account data 608 associated with the cardholder and purchase data 614 associated with purchased item.

In the exemplary embodiment, payment computer device 616 is configured to store first transaction data 618 which includes vehicle identifier 606, account data 608 and purchase data 614. Payment computer device 616 is configured to store and/or track other transaction data 619 associated with other purchased items related to the vehicle. First transaction data 618 and other transaction data 619 define a total transaction data 621 associated with the vehicle. Moreover, payment computer device 616 is configured to track, categorize, organize, and/or analyze first transaction data 618 and/or total transaction data 621 and further associate stored first transaction data 618 and/or total transaction data 621 with vehicle identifier 606 for access by the cardholder. In one embodiment, payment computer device 616 is configured to aggregate a monetary value of the stored purchase data 614 and/or stored first transaction data 618 and/or total transaction data 621 over a period of time. Payment computer device 616 can also analyze consumption of purchase data 614 and/or stored first transaction data 618 and/or total transaction data 621 over a period of time and/or over an amount of distance traveled by the vehicle. For example, payment computer device 616 is configured to store purchase data 614 such as gas purchased during a particular month and transmit to vehicle computer device 118 the type of gas purchased, the volume amount of gas purchased and/or a monetary amount of gas purchased.

Vehicle computer device 118 is configured to allow a cardholder to access merchant processor 604 and access payment computer device 616 and electronically transact with merchant computer device 610 and/or payment computer device 616. In the exemplary embodiment, vehicle computer device 118 is configured to conduct electronic transactions associated with first transaction data 618 such as, but not limited to, financial transactions, product transactions and service transactions associated with the vehicle and to present the transactions to the cardholder. Vehicle computer device 118 is also configured transmit a report call 620 to payment processor 602 to request a report message 622 which includes a record of stored transaction data 618 and/or total transaction data 621 including financial transactions, product transactions and service transactions associated with the vehicle.

Payment computer device 616 stores transaction data 618 and/or total transaction data 621 including at least vehicle identifier 606, account data 608 and purchase data 614 for the selected vehicle. The cardholder may view transaction data 618, 621 by transmitting report call 620 to payment computer device 616, receiving report message 622, and displaying report message 622 using a media output device of vehicle computer device 118. More particularly, payment computer device 616 is configured to transmit report message 622 including first transaction data 618 and/or total transaction data 621 to vehicle computer device 618. Vehicle computer device 618 is configured to receive report message 622 including first transaction data 618 and/or total transaction data 621 from payment computer device for display to the cardholder.

Included in system 600 is a third party payment module 628 which allows vehicle computer device 118 to perform a transaction using third party payment module 628 and not merchant processor 604. In the exemplary embodiment, third party payment module 628 may be a computer system such as system 122 (shown in FIGS. 2 and 3). Third party payment module 628 may be used by a cardholder to process vehicle related transactions (e.g., vehicle insurance payments, vehicle loan payments, satellite radio payments, and other vehicle related expenses).

For example, a cardholder may select a vehicle related expense using an input device of vehicle computer device 118. Vehicle identifier 606, account data 608 and purchase data 614 including data relative the selected vehicle related expense are transmitted from vehicle computer device 118 to third party payment module 628. In one embodiment, third party payment module 628 is a website accessible by a URL. Third party payment module 628 generates payment authorization request message 624 after receiving purchase data 614 from vehicle computer device 118, wherein the message includes at least vehicle identifier 606, account data 608 and purchase data 614. Payment authorization request message 624 is transmitted from third party payment module 628 to payment computer device 616 for processing and further transmission to an issuing bank for approval. In one embodiment, the payment authorization request message 624 is transmitted from third party payment module 628 to merchant computer device 610 associated with the selected vehicle related expense and further transmitted to the payment computer device 616. The issuing bank determines whether to approve or decline the transaction, generates payment authorization response message 626 accordingly, and transmits payment authorization response message 626 to payment computer device 616.

Third party payment module 628 stores transaction data 618 and/or total transaction data 621 including at least vehicle identifier 606, account data 608 and purchase data 614 for the selected vehicle. The cardholder may view transaction data 618 and/or total transaction data 621 by transmitting report call 620 to payment computer device 616, receiving report message 622, and displaying report message 622 using a media output device of vehicle computer device 118. More particularly, third party payment module 628 is configured to transmit report message 622 including first transaction data 618 and/or total transaction data 621 to vehicle computer device 618. Vehicle computer device 618 is configured to receive report message 622 including first transaction data 618 and/or total transaction data 621 from third party payment module 628 for display to the cardholder.

In one embodiment, a cardholder enters a merchant's location such as the merchant's store. After selecting the purchase item, (i.e., a car battery), the cardholder conducts the transaction with a POS device (e.g., POS terminal 115 shown in FIG. 2) such as by swiping the card with the POS device to transmit purchase data 614 associated with the purchased item to payment computer device 616. Additionally, the cardholder enters vehicle identifier 606 into the POS device to associate purchase data 614 with a particular vehicle. More particularly, the cardholder enters vehicle identifier 606 into the POS device which is configured to transmit payment authorization request message 624 and first transaction data 618 including vehicle identifier 606, account data 608 and purchase data 614 to payment computer device 616. Payment computer device 616 is configured to conduct the transaction with the merchant's POS device. Moreover, payment computer device 616 is configured to store and/or track vehicle identifier 606, account data 608 and purchase data 614 for subsequent access by vehicle computer device 118 as previously described.

In another embodiment, a cardholder enters a merchant's location such as the merchant's store. After selecting the purchase item (i.e., a car battery), the cardholder conducts the transaction with a POS device such as by swiping a card with the POS device. The card is configured to store vehicle identifier 606 and to transmit vehicle identifier 606 to the POS device. In response, the POS device is configured to transmit payment authorization request message 624 and first transaction data 618 including vehicle identifier 606, account data 608, and purchase data 614 to payment computer device 616. Payment computer device 616 is configured to conduct the transaction with the merchant's POS device. Moreover, payment computer device 616 is configured to store and/or track vehicle identifier 606, account data 608 and purchase data 614 for subsequent access by vehicle computer device 118 as previously described.

In yet another embodiment, a cardholder enters the merchant's location such as the merchant's store. After selecting the purchased item (i.e., a car battery), the cardholder conducts the transaction with a POS device such as by swiping the card with the POS device. Payment computer device 616 is configured to conduct the transaction with the merchant's POS device. The cardholder then returns to the vehicle and enters first transaction data 618 including vehicle identifier 606, account data 608 and purchase data 614 into vehicle computer device 118. Vehicle computer device 118 is configured to transmit vehicle identifier 606, account data 608 and purchase data 614 to payment computer device 616. Moreover, payment computer device 616 is configured to store and/or track vehicle identifier 606, account data 608 and purchase data 614 for subsequent access by vehicle computer device 118 as previously described.

Figure 7:
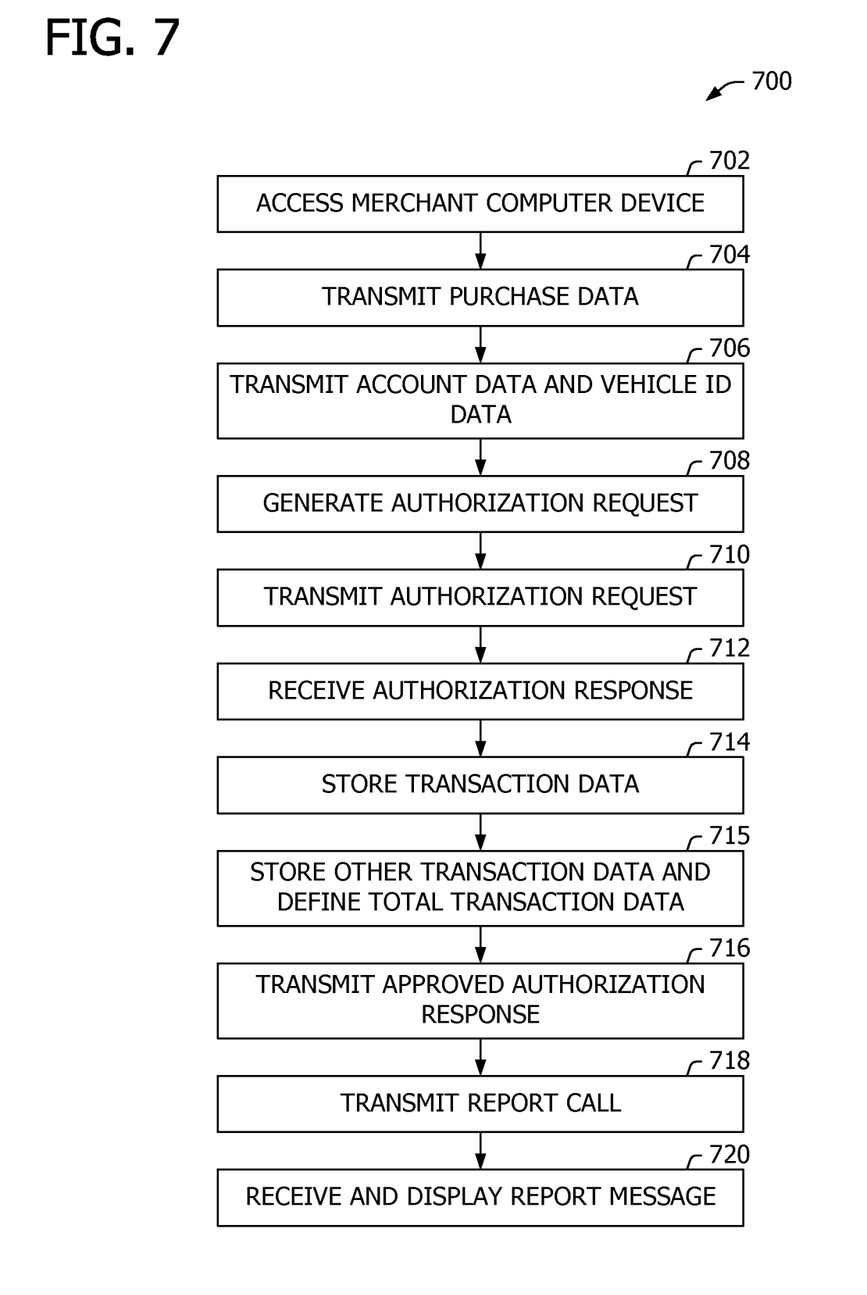
FIG. 7 is a flowchart illustrating an exemplary process for using a vehicle computer device when performing a transaction in accordance with one embodiment of the present invention.

FIG. 7 is a flowchart illustrating an exemplary process 700 for using a vehicle computer device, such as vehicle computer device 118 (shown in FIG. 6), when performing a transaction in accordance with one embodiment of the present invention. In one embodiment, process 700 may be implemented by system 100 (shown in FIG. 2). In the exemplary embodiment, process 700 relates to the receiving and transmitting of messages and information among vehicle computer device 118, merchant computer device 610, and payment computer device 616 (all shown in FIG. 6). While operations within the process 700 are described below with regard to particular devices and/or systems, process 700 may be implemented on other such devices and/or systems by one skilled in the art.

During operation, a cardholder accesses 702 merchant computer device 610 from vehicle computer device 118 for receiving offer data 612 from merchant computer device 610. Upon initiation by the cardholder, vehicle computer device 118 transmits 704 purchase data 614 to merchant computer device 610. Vehicle computer device 118 also transmits 706 account data 608 and vehicle identifier 606 to merchant computer device 610.

Merchant computer device 610 then generates 708 payment authorization request message 624 and first transaction data 618 which includes at least vehicle identifier 606, account data 608 and purchase data 614. Payment authorization request message 624 is transmitted 710 from merchant computer device 610 to payment computer device 616 for processing and further transmission to an issuing bank for approval. Payment computer device 616 receives 712 a payment authorization response message 626 from the issuing bank either approving or denying the transaction. When the issuing bank approves the transaction, first transaction data 618 are stored 714 at the payment computer device 616. Other transaction data 619 associated with other purchased items for the vehicle are stored 715 at payment computer device 616, wherein first transaction data 618 and other transaction data 619 define total transaction data 621. Total transaction data 621 is tracked, by vehicle identifier 606, by payment computer device 616 for access by the cardholder. The approved payment authorization response message 626 is transmitted 716 to merchant computer device 610 so that the transaction can be completed with the cardholder.

The cardholder is able to receive details regarding previous transactions by transmitting 718 report call 620 from vehicle computer device 118 to payment computer device 616, wherein report call 620 is a request for the payment computer device 618 to generate report message 622 from stored transaction data 618 for the selected vehicle. In the exemplary embodiment, the selected vehicle is identified by vehicle identifier 606. The cardholder receives 720 report message 622 from payment computer device 616 and displays the message using vehicle computer device 118.

In some embodiments, one or more messages sent between the different computer systems, or a portion thereof, are encrypted by the sending device and decrypted by the receiving device. For example, the payment authorization response message may be encrypted by the express check out platform and decrypted by the merchant computer. In one embodiment, the interchange computer system encrypts an account number (e.g., a PAN) using a public key assigned to the merchant, and the merchant computer system decrypts the account number using a private key corresponding to the public key. For example, the private key and the public key may be assigned to the merchant by the interchange network for use in signing documents and/or messages, and may also be used for encrypting messages transmitted between the merchant and the interchange network.

While the invention has been described in terms of various specific embodiments, those skilled in the art recognize that the invention can be practiced with modification within the spirit and scope of the claims.

Exemplary embodiments of methods, systems, and computer-readable storage media for use in implementing an electronic transaction processing system are described above in detail. The methods, systems, and storage media are not limited to the specific embodiments described herein but, rather, operations of the methods and/or components of the system may be utilized independently and separately from other operations and/or components described herein. Further, the described operations and/or components may also be defined in, or used in combination with, other systems, methods, and/or storage media, and are not limited to practice with only the methods, systems, and storage media as described herein.

A computing device, such as those described herein, includes at least one processor or processing unit and a system memory. The computing device typically has at least some form of computer readable media. By way of example and not limitation, computer readable media include computer storage media and communication media. Computer storage media include volatile and nonvolatile, removable and non-removable physical media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Although the present invention is described in connection with an exemplary electronic transaction processing system environment, embodiments of the invention are operational with numerous other general purpose or special purpose electronic transaction processing system environments or configurations. The electronic transaction processing system environment is not intended to suggest any limitation as to the scope of use or functionality of any aspect of the invention. Moreover, the electronic transaction processing system environment should not be interpreted as having any dependency or requirement relating to any one or combination of components illustrated in the exemplary operating environment. Examples of well-known electronic transaction processing systems, environments, and/or configurations that may be suitable for use with the embodiments described herein include, but are not limited to, embedded computing devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers, processors, and/or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal languages of the claims.

What is claimed is:

1. A computer-implemented method for performing an electronic transaction using a payment computer coupled to a database, the transaction including an item purchased in association with a vehicle and initiated by a cardholder with a merchant, said method comprising:
    receiving, at the payment computer, an authorization request message from a merchant computing device of the merchant, the authorization request message including first transaction data, wherein the first transaction data includes a vehicle identifier for identifying the vehicle, an account data associated with the cardholder, and a purchase data associated with a first purchased item, wherein the first purchased item is a vehicle related expense for at least one of operating and maintaining the vehicle;
    transmitting an authorization response message from the payment computer to the merchant computing device, the authorization response message including an approval of the electronic transaction by an issuer bank;
    storing, within the database, the first transaction data including the vehicle identifier;
    storing, within the database, other transaction data associated with other purchased items for the vehicle, wherein the first transaction data and the other transaction data define a total transaction data associated with the vehicle;
    receiving, from a vehicle computer in the vehicle, a request for a report of vehicle related expenses for the requesting vehicle;
    preparing, by the payment computer, the requested report of vehicle related expenses for the requesting vehicle using at least the vehicle identifier, the first transaction data, and the other transaction data; and
    transmitting, to the vehicle computer in the requesting vehicle, the requested report of vehicle related expenses, wherein the vehicle computer is coupled to the payment computer through a communication network.

2. The computer-implemented method in accordance with claim 1, wherein the payment computer comprises an interchange computer associated with an interchange network.

3. The computer-implemented method in accordance with claim 1, wherein the payment computer comprises a third party payment module computer.

4. The computer-implemented method in accordance with claim 1, wherein the vehicle computer is configured to transact with the payment computer.

5. The computer-implemented method in accordance with claim 4, further comprising transmitting, from the payment computer, the total transaction data to the vehicle computer.

6. The computer-implemented method in accordance with claim 4, further comprising receiving, at the vehicle computer, the total transaction data from the payment computer.

7. The computer-implemented method in accordance with claim 4, further comprising transmitting, from the vehicle computer, the vehicle identifier to the payment computer.

8. The computer-implemented method in accordance with claim 4, further comprising transmitting, from the vehicle computer, the purchase data to the payment computer.

9. The computer-implemented method in accordance with claim 4, further comprising transmitting, from the vehicle computer, a selected type of fuel to the payment computer.

10. The computer-implemented method in accordance with claim 4, further comprising receiving, at the payment computer, a type of fuel selected by the vehicle computer.

11. The computer-implemented method in accordance with claim 4, further comprising transmitting, from the vehicle computer, a selected volume amount of fuel to the payment computer.

12. The computer-implemented method in accordance with claim 4, further comprising receiving, at the payment computer, a volume amount of fuel selected by the vehicle computer.

13. The computer-implemented method in accordance with claim 1, further comprising transmitting, from a point of sale device, the first transaction data.

14. The computer-implemented method in accordance with claim 1, further comprising aggregating, by the payment computer, a monetary value of the total transaction data over a period of time.

15. The computer-implemented method in accordance with claim 1, further comprising analyzing, by the payment computer, consumption of the total transaction data over a period of time.

16. The computer-implemented method in accordance with claim 1, further comprising analyzing, by the payment computer, consumption of the total transaction data over an amount of distance traveled by the vehicle.

17. The computer-implemented method in accordance with claim 1, wherein the purchase data comprises at least one of a financial transaction, a product transaction and a service transaction associated with the vehicle.

18. The computer-implemented method in accordance with claim 17, wherein the financial transaction comprises at least one of a vehicle loan payment and a vehicle insurance payment.

19. The computer-implemented method in accordance with claim 17, wherein the service transaction comprises a satellite service payment.

20. One or more non-transitory computer-readable storage media having computer-executable instructions embodied thereon for processing an electronic transaction using a payment computer coupled to a database, the electronic transaction including an item purchased in association with a vehicle and initiated by a cardholder with a merchant, wherein the payment computer includes a memory device and a processor, wherein when executed by said processor, said computer-executable instructions cause said processor to:
receive an authorization request message from a merchant computing device of the merchant, the authorization request message including a first transaction data, wherein the first transaction data includes a vehicle identifier for identifying the vehicle, an account data associated with the cardholder, and a purchase data associated with a first purchased item, wherein the first purchased item is a vehicle related expense for operation or maintenance of the vehicle;
transmit an authorization response message to the merchant computing device including an approval of the electronic transaction by an issuer bank;
store, within the database, the first transaction data including the vehicle identifier;
store, within the database, other transaction data associated with other purchased items for the vehicle, wherein the first transaction data and the other transaction data define a total transaction data associated with the vehicle;
receive, from a vehicle computer in the vehicle, a request for a report of vehicle related expenses for the requesting vehicle;
prepare, by the payment computer, the requested report of vehicle related expenses for the requesting vehicle using at least the vehicle identifier and the total transaction data; and
transmit, to the vehicle computer in the requesting vehicle, the requested report of vehicle related expenses, the report for use in operating or maintaining the vehicle, wherein the vehicle computer is coupled to the payment computer through a communication network.

21. A system for performing an electronic transaction including an item purchased in association with a vehicle and initiated by a cardholder with a merchant, said system comprising:
a payment computer configured to:
receive an authorization request message from a merchant computing device of the merchant, the authorization request message including first transaction data, wherein the first transaction data includes a vehicle identifier for identifying the vehicle, an account data associated with the cardholder, and purchase data associated with a first purchased item, wherein the first purchased item is a vehicle related expense for at least one of operating and maintaining the vehicle;
transmit an authorization response message to the merchant computing device including an approval of the electronic transaction by an issuer bank;
store, within the database, the first transaction data including the vehicle identifier;
store, within the database, other transaction data associated with other purchased items for the vehicle, wherein the first transaction data and the other transaction data define a total transaction data associated with the vehicle;
receiving, from a vehicle computer in the vehicle, a request for a report of vehicle related expenses for the requesting vehicle;
prepare, by the payment computer, the requested report of vehicle related expenses for the requesting vehicle using at least the vehicle identifier and the total transaction data; and
transmit, to the vehicle computer in the requesting vehicle, the requested report of vehicle related expenses; and
a vehicle computer comprising an output device, wherein the vehicle computer is coupled to the payment computer through a communication network, the vehicle computer configured to:
receive the report from the payment computer; and
display the report on the output device within the vehicle.

22. The system in accordance with claim 21, wherein the purchase data comprises at least one of a financial transaction, a product transaction and a service transaction associated with the vehicle.

23. A computing system for performing an electronic transaction associated with vehicle related expenses of a vehicle, the computing system including a payment computer, the payment computer including a processor coupled to a database, said processor configured to:
receive, at the payment computer, an authorization request message from a merchant computing device of a merchant, the authorization request message including first transaction data, wherein the first transaction data includes a vehicle identifier for identifying the vehicle, an account data associated with the cardholder, and a purchase data associated with a first purchased item, wherein the first purchased item is a vehicle related expense for at least one of operating and maintaining the vehicle;

transmit an authorization response message from the payment computer to the merchant computing device, the authorization response message including an approval of the electronic transaction by an issuer bank;

store, within the database, the first transaction data including the vehicle identifier;

store, within the database, other transaction data associated with other purchased items for the vehicle, wherein the first transaction data and the other transaction data define a total transaction data associated with the vehicle;

receive, from a vehicle computer in the vehicle, a request for a report of vehicle related expenses for the requesting vehicle;

prepare, by the payment computer, the requested report of vehicle related expenses for the requesting vehicle using at least the vehicle identifier and the total transaction data; and transmit, to the vehicle computer in the requesting vehicle, the requested report of vehicle related expenses, wherein the vehicle computer is coupled to the payment computer through a communication network.

24. The computer-implemented method in accordance with claim 1, further comprising aggregating, by the payment computer, a monetary value of the total transaction data over a period of time.

25. The computer-implemented method in accordance with claim 1, further comprising analyzing, by the payment computer, consumption of the total transaction data over a period of time.

26. The computer-implemented method in accordance with claim 1, further comprising analyzing, by the payment computer, consumption of the total transaction data over an amount of distance traveled by the vehicle.

27. The computer-implemented method in accordance with claim 1, wherein the purchase data comprises at least one of a financial transaction, a product transaction and a service transaction associated with the vehicle.

28. The computer-implemented method in accordance with claim 17, wherein the financial transaction comprises at least one of a vehicle loan payment and a vehicle insurance payment.

\* \* \* \* \*